United States Patent
Elder et al.

(10) Patent No.: US 9,977,653 B2
(45) Date of Patent: May 22, 2018

(54) DISCOVERY AND MODELING OF DEPLOYMENT ACTIONS FOR MULTIPLE DEPLOYMENT ENGINE PROVIDERS

(75) Inventors: Michael D. Elder, Durham, NC (US); Indrajit Poddar, Sewickley, PA (US); Daniel C. Berg, Holly Springs, NC (US); Yulia Gaponenko, Moscow (RU); Yuri Pravosud, Moscow (RU)

(73) Assignee: International Business Machines Corporation, Armonk, NY (US)

( * ) Notice: Subject to any disclaimer, the term of this patent is extended or adjusted under 35 U.S.C. 154(b) by 556 days.

(21) Appl. No.: 13/539,321

(22) Filed: Jun. 30, 2012

(65) Prior Publication Data

US 2014/0007082 A1    Jan. 2, 2014

(51) Int. Cl.
*G06F 9/44* (2018.01)
*G06F 9/445* (2018.01)

(52) U.S. Cl.
CPC .................. *G06F 8/20* (2013.01); *G06F 8/60* (2013.01); *G06F 8/10* (2013.01)

(58) Field of Classification Search
CPC ....... H04L 29/08981; G06F 8/20; G06F 8/10; G06F 8/35; G06F 9/541; G06Q 10/10
USPC ......... 709/222, 220, 226, 200; 717/176–178, 717/174; 718/1, 104
See application file for complete search history.

(56) References Cited

U.S. PATENT DOCUMENTS

| | | | | |
|---|---|---|---|---|
| 7,340,520 B1 * | 3/2008 | Jordan et al. | ................. | 709/226 |
| 7,512,937 B2 * | 3/2009 | Chari | ................ | G06F 17/30569 717/109 |
| 7,610,584 B2 * | 10/2009 | Brooks | ............... | H04L 41/0806 718/100 |
| 7,636,782 B2 * | 12/2009 | Jordan et al. | ................. | 709/226 |
| 7,849,460 B1 * | 12/2010 | Martin et al. | ................. | 717/174 |
| 8,037,471 B2 * | 10/2011 | Keller et al. | .................. | 717/174 |

(Continued)

OTHER PUBLICATIONS

Konstantinou, Alexander V. et al. "An Architecture for Virtual Solution Composition and Deployment in Infrastructure Clouds", 2009, ACM.*

*Primary Examiner* — Lewis A Bullock, Jr.
*Assistant Examiner* — Gilles Kepnang
(74) *Attorney, Agent, or Firm* — David J. Zwick; Gregory K. Goshorn; Greg Goshorn, P.C.

(57) ABSTRACT

Provided are techniques for modeling operational units, each operational unit corresponding to an operational workflow and to one or more deployment engines of a plurality of deployment engines; selecting, for each of the plurality of operational units, one of the corresponding deployment engines; ordering the operational units with respect to the operational workflow; grouping the ordered operation units according to the selected deployment engines into deployment engine groupings; mapping output parameters corresponding to a first operational unit that concludes a first deployment engine grouping to input parameters corresponding to a second operational unit that initiates a second deployment engine grouping, inserting between the first operational unit and the second operational unit a transitional operational unit for transitioning between a first deployment engine corresponding to the first deployment engine grouping and a second deployment engine corresponding to the second deployment engine grouping to generate a multi-deployment engine operational workflow.

15 Claims, 8 Drawing Sheets

(56) References Cited

U.S. PATENT DOCUMENTS

| | | | | |
|---|---|---|---|---|
| 8,327,341 B2* | 12/2012 | Stark | | 717/136 |
| 8,352,936 B2* | 1/2013 | Chowdhury | | G06F 8/60 |
| | | | | 717/177 |
| 8,914,768 B2* | 12/2014 | Karnik | | G06F 8/61 |
| | | | | 717/104 |
| 8,930,942 B2* | 1/2015 | Vorthmann et al. | | 717/177 |
| 2002/0188644 A1* | 12/2002 | Seidman | | G06Q 10/10 |
| | | | | 718/100 |
| 2003/0037328 A1* | 2/2003 | Cicciarelli et al. | | 717/178 |
| 2006/0026591 A1* | 2/2006 | Backhouse et al. | | 717/177 |
| 2006/0106585 A1* | 5/2006 | Brown | | G06F 8/20 |
| | | | | 703/1 |
| 2007/0180018 A1* | 8/2007 | Srinivasan et al. | | 709/200 |
| 2008/0040455 A1* | 2/2008 | MacLeod | | G06F 8/61 |
| | | | | 709/220 |
| 2008/0098099 A1* | 4/2008 | Khasnis et al. | | 709/222 |
| 2008/0250405 A1* | 10/2008 | Farhangi et al. | | 717/177 |
| 2008/0256531 A1* | 10/2008 | Gao | | G06F 8/61 |
| | | | | 717/177 |
| 2008/0256549 A1* | 10/2008 | Liu et al. | | 718/106 |
| 2009/0007095 A1* | 1/2009 | Alverson et al. | | 717/176 |
| 2009/0320019 A1* | 12/2009 | Ellington et al. | | 717/177 |
| 2010/0205616 A1 | 8/2010 | Lai et al. | | |
| 2010/0281455 A1* | 11/2010 | Anand | | G06F 8/24 |
| | | | | 717/104 |
| 2010/0281456 A1* | 11/2010 | Eizenman | | G06F 8/20 |
| | | | | 717/104 |
| 2010/0306772 A1* | 12/2010 | Arnold et al. | | 718/1 |
| 2011/0004565 A1* | 1/2011 | Stephenson et al. | | 705/348 |
| 2011/0029967 A1* | 2/2011 | Berg | | G06F 8/61 |
| | | | | 717/175 |
| 2011/0131557 A1* | 6/2011 | Bouillet | | G06F 9/541 |
| | | | | 717/138 |
| 2011/0321033 A1* | 12/2011 | Kelkar | | G06F 9/44505 |
| | | | | 717/174 |
| 2012/0159471 A1* | 6/2012 | de Souza et al. | | 717/178 |
| 2013/0151975 A1* | 6/2013 | Shadi | | G06F 8/60 |
| | | | | 715/734 |
| 2013/0232497 A1* | 9/2013 | Jalagam et al. | | 718/104 |

* cited by examiner

001
DISCOVERY AND MODELING OF DEPLOYMENT ACTIONS FOR MULTIPLE DEPLOYMENT ENGINE PROVIDERS

FIELD OF DISCLOSURE

The claimed subject matter relates generally to computing systems and, more specifically, to techniques for the automation of computing solution deployments using multiple deployment engines.

SUMMARY

Provided are techniques for the automation of computing solution deployments using multiple deployment engines. The deployment of software solutions can be time consuming and error prone. While end-to-end deployment automation can reduce time and errors and enable standardization and best practices, such automation may also require orchestration of steps that involve multiple deployment engines. For example, IBM PureScale Application Server may be used to deploy virtual images of software; Trivoli Provisioning Manager and Network Control Manager may be used to configure firewall rules and networks; and Rational Automation Framework for WebSphere may be used to install and configure WebSphere Application Server applications.

Provided are techniques for modeling a plurality of operational units, each operational unit corresponding to an operational workflow and to one or more deployment engines of a plurality of deployment engines; selecting, for each of the plurality of operational units, one of the corresponding deployment engines of the one or more corresponding deployment engines; ordering the operational units with respect to the operational workflow; grouping the ordered operation units according to the corresponding selected deployment engines into a plurality of deployment engine groupings; mapping a plurality of output parameters corresponding to a first operational unit that concludes a first deployment engine grouping of the plurality of deployment engine groupings to a plurality of input parameters corresponding to a second operational unit that initiates a second deployment engine grouping, wherein the second grouping immediately follows the first grouping with respect to the ordering; inserting, between the first operational unit and the second operational unit, a transitional operational unit for transitioning between a first deployment engine corresponding to the first deployment engine grouping and a second deployment engine corresponding to the second deployment engine grouping to generate a multi-deployment engine operational workflow; and storing for execution the multi-deployment engine operational workflow.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures.

DETAILED DESCRIPTION

Figure 1:
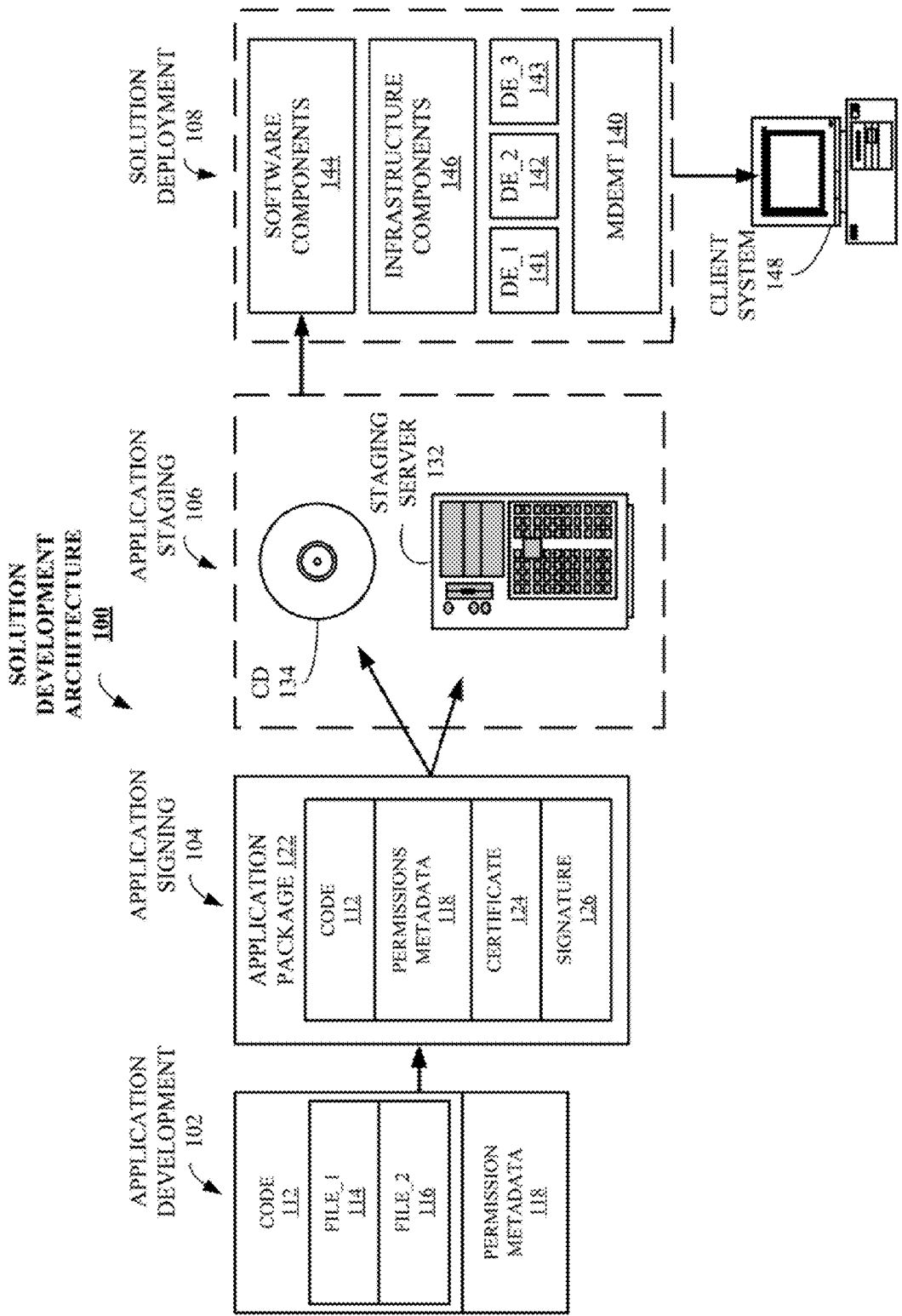
FIG. 1 is a block diagram of one example of a solution development architecture, including distribution elements, that employs the claimed subject matter.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational actions to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As the Inventors herein have realized, the orchestration of software solutions can be time consuming and error-prone. Challenges when utilizing multiple deployment engines include, but are not limited to:

1. Modeling deployment steps requires knowledge of the capabilities of different deployment engines and the corresponding data models;
2. Solution designers need to find an appropriate deployment engine and specific deployment action for each component of the software solution;
3. Parameters need to be passed between different deployment engines and transformed into deployment engine specific data model entities; and
4. Flow control steps may need to be introduced between sets of deployment engine specific steps.

Standards such as BPMN, IBM's proposed TOSCA standard, allow deployment engine agnostic representation of orchestration workflows but also may require modeling extensions that may be deployment engine specific. Rational Software Architect allows modeling of solution components but does not support discovering operations from different deployment engines for a given solution component and create orchestrations spanning multiple deployment engines for all solution components.

Turning now to the figures, FIG. 1 is a block diagram of a solution development system 130 that employs the claimed subject matter. Although primarily focusing on application development, architecture 100 is directed to a total solution, including hardware, including delivery. Architecture 100 is separated into four (4) stages, specifically an application development 102, an application signing 104, an application staging 106 and a solution deployment 108. The claimed subject matter is primarily related to solution deployment 108 and, therefore, this description will primarily focus on that area. Those with skill in the relevant arts should be familiar with stages 102, 104 and 106.

During application development 102, a developer creates code 112 and defines a permission metadata file 118 that is associated with code 116. Code 112 includes files; i.e. a file_1 114 and a file_2 116. For the sake of simplicity, file_1 114 and file_2 116 are only shown in code 112 during one stage of the architecture 100, although it should be understood that files 114 and 116 are part of code 112 throughout phases 104, 106 and 108 as well. The development of code 112 may include, but is not limited to, the writing of custom computer code and the incorporation of third party code and software products. In other words, code 112 may include any number of separate components, each of which may be off-the-self products, created by technical experts, or developed by third party vendors. File_1 114 and file_2 116 are two (2) such components. It should be noted that files 114 and 116 are used for the purposes of illustration only; a typical application and corresponding code 112 would include many files and components. For the sake of simplicity, only file_1 114 and file_2 116 are shown.

During application signing 104, a trusted party, such as a system administrator, inspects code 112 and permissions metadata file 118 and, if security requirements are met, certifies code 112 and file 118 by adding a certificate 124 and a corresponding signature 126. Prior to certification, additional files (not shown) may be included with code 112 and permissions metadata file 118. Once certified, code 112, permissions metadata file 118, certificate 124 and signature 126 become part of an application package 122, which cannot be modified without invalidating certificate 124 and signature 126. In other words, if code 112 or any of the component parts such as files 114 or 116 are modified, code 112 and permissions metadata file 118 must be recertified by inserting a new certificate 124 and signature 124. Thus, certificate 124 and signature 126 of application package 122 enable a system administrator or other authorized user to deploy application package 122 with the knowledge that application package 122 has been screened for security purposes. Those with skill in the relevant arts should understand the generation and use of certificate 124 and signature 126.

Application staging 106 illustrates some possible techniques for distributing application package 122 to solution deployment 108, including, but are not limited to, a compact disk (CD) 134, which may be mailed or otherwise delivered to, and staging server 132 from which a product or solution, such as application package 122 may be downloaded. Those with skill in the computing arts should recognize that there are many possible delivery options in addition to CD 134 and staging server 122.

In this example, application package 122 becomes part of a software components 144 of solution deployment 108. In addition, to software components 144, solution deployment 108 includes infrastructure components 146. Infrastructure components 146 include, but are not limited to, resources that may be provisioned as either virtual or physical elements of a solution architecture. Software components 144 and infrastructure components 146 are delivered to a client system 148 by means of delivery engines (DEs), i.e. a DE_1 141, a DE_2 142 and a DE_3 143. As explained in more detail below in conjunction with FIGS. 2-9, DEs 141-143 are coordinated with a Multiple Deployment Engine Modeling Tool (MDEMT) 140.

Figure 2:
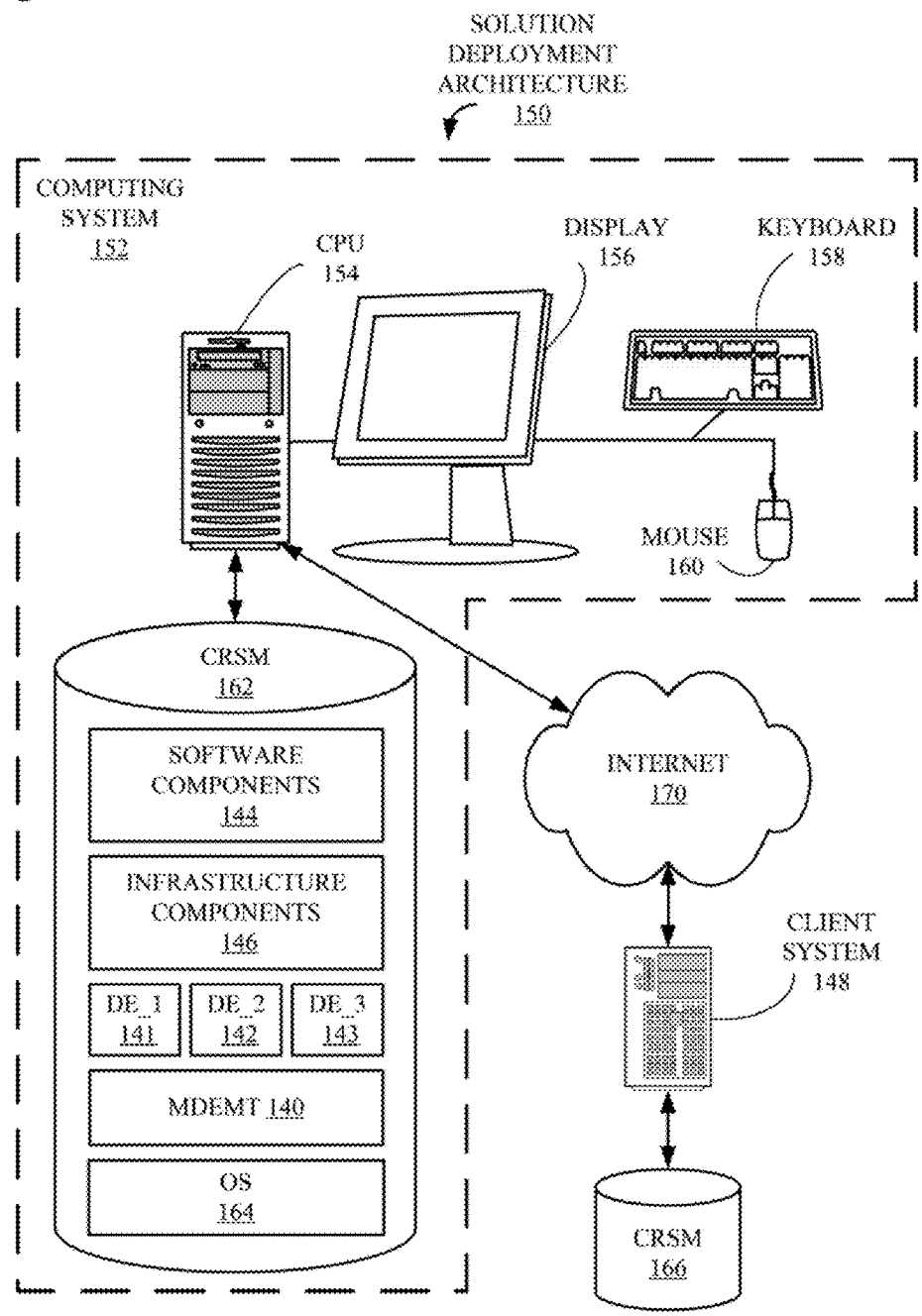
FIG. 2 is a block diagram of an example of a computing architecture that may support the claimed subject matter.

FIG. 2 is a block diagram of an example of a solution deployment architecture 150 that may support the claimed subject matter. Architecture 150 illustrates in more detail components of one example of solution deployment 108 (FIG. 1). A computing system 152 includes a central processing unit (CPU) 154, which may include one or more processors (not shown), coupled to a display 156, a keyboard 158 and a pointing device, or "mouse," 160, which together facilitate human interaction with computing system 150.

Also included in computing system 152 and attached to CPU 154 is a computer-readable storage medium (CRSM) 162, which may either be incorporated into computing system 152 i.e. an internal device, or attached externally to computing system 152 and CPU 154 by means of various, commonly available connection devices such as but not limited to, a universal serial bus (USB) port (not shown). CRSM 162 is illustrated storing an operating system (OS) 164, software components 144 (FIG. 1), infrastructure components 146 (FIG. 1), DEs 141-143 (FIG. 1) and MDEMT 140 (FIG. 1).

MDEMT 140 generates a deployment plan that utilizes the capabilities of DEs 141-143 to deploy components of software components 144 and infrastructure components 146. In this example, a solution is deployed over the Internet 170 to a client system 148 (FIG. 1). Like CRSM 162 coupled to computing system 152, client system 148 is coupled to a CRSM 166. In addition, client system would have a CPU, monitor, keyboard and mouse although they are not shown for the sake of simplicity. In this example, computing system 152 and client system 148 are communicatively coupled via the Internet 170 although they could also be coupled through any number of communication mediums such as, but not limited to, a local area network (LAN) (not shown). Further, it should be noted there are many possible solution deployment architectures of which solution deployment architecture 150 is only one simple example used throughout the Description.

Figure 3:
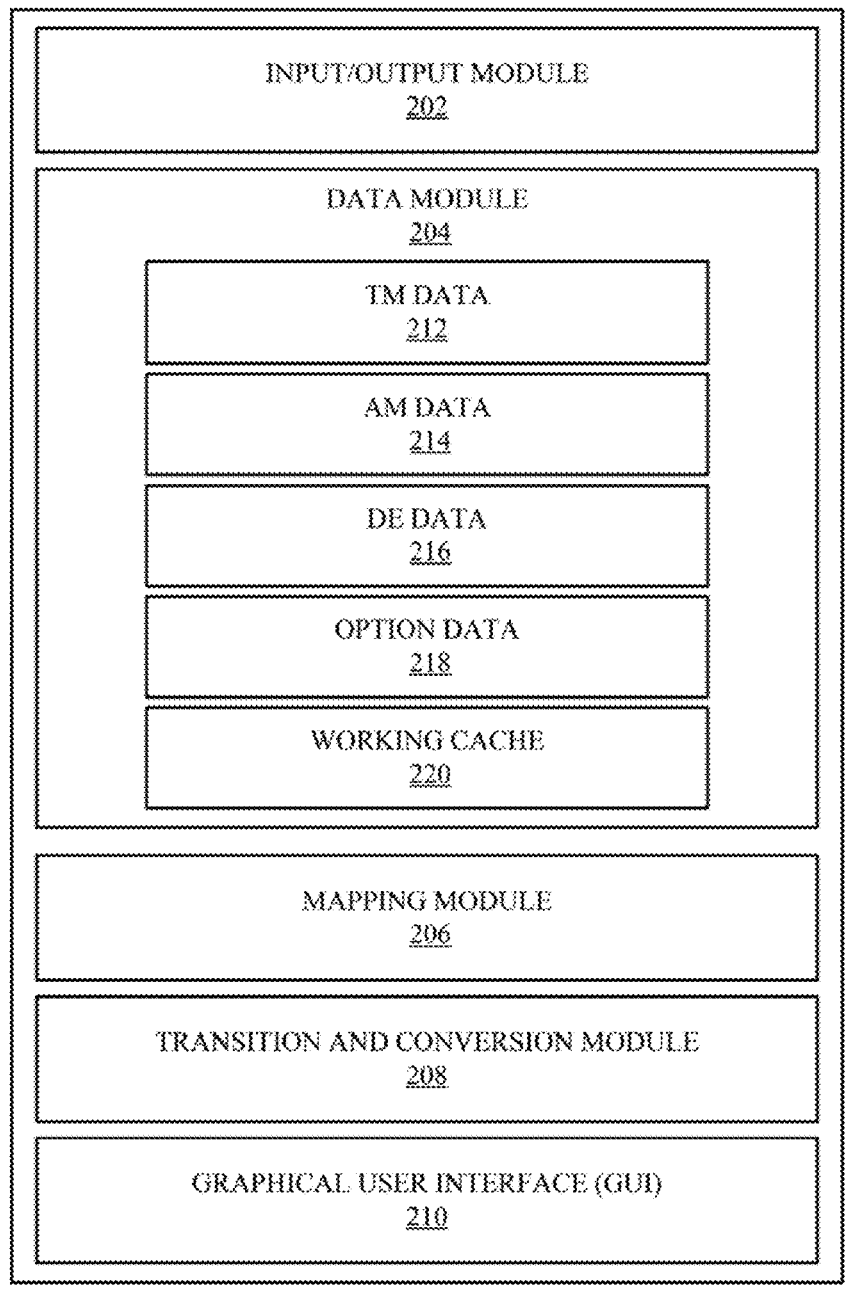
FIG. 3 is a block diagram of a Multiple Deployment Engine Modeling Tool (MDEMT), introduced in FIGS. 1 and 2, in more detail.

FIG. 3 is an example of MDEMT 140 of FIGS. 1 and 2, showing various logical components. MDEMT 140 includes an input/output (I/O) module 202, a data module 204, a mapping module 206, a transition and conversion module 208 and a graphical user interface (GUI) module 210. For the sake of the following examples, logic associated with MDEMT 140 is assumed to execute on computing system 152 (FIG. 2) and stored in CRSM 162 (FIG. 2). It should be understood that the claimed subject matter can be implemented in many types of computing systems and data storage structures but, for the sake of simplicity, is described only in terms of computing system 152 and solution deployment architecture 150 (FIG. 2). Further, the representation of MDEMT 140 in FIG. 3 is a logical model. In other words, components 202, 204, 206, 208 and 210 may be stored in the same or separates files and loaded and/or executed within architecture 150 either as a single system or as separate processes interacting via any available inter process communication (IPC) techniques.

I/O module 202 handles any communication MDEMT 140 has with other components of system 150. Data module 204 is a data repository for information, including topology model (TM) data 212, action model (AM) data 214, deployment engine (DE) data 216, option data 218 and a working cache 220. TM data 212 stores topology model units (see 241-243, FIG. 4) including but not limited to information on elements of software components 144 (FIG. 2), infrastructure components 146 (FIG. 2) and attributes of and relationships among the elements of components 144 and 146. AM data 214 stores information on the structure of available action models (see 251-253, FIG. 4) including but not limited to operation names and topology model units to which a particular operation may apply. Also included are names and ID of corresponding actions, parameter names and values (or links to values from different solution component model units (not shown) stored in TM data 212), internal data transformation information and information to identify corresponding DEs such as DEs 141-143 (FIG. 2).

DE data 216 stores information related to available deployment engines such as DEs 141-143 (FIG. 2). Such data may include available action models and parameter formats. Options data 218 stores user defined values and preferences that control the operation of MDEMT 140 and the look of GUI 210. Working cache 220 stores the results of on-going and intermediate operations of MDEMT 140.

Mapping module 206 stores logic for generating a list to show the correlation between any deployment steps (see 260-265, FIG. 4) and action models (see 251-253, FIG. 4) among different DEs 141-143. Transition and Conversion module 208 generates deployment steps that enable a transition between DEs 141-142. In other words, if two adjacent deployment steps in a particular deployment solution are assigned to different DEs 141-143, a deployment step is generated by MDEMT 140 to make the transition from the first of the two DEs to the second. In addition, output parameters of the first deployment step in the first DE are matched to input parameters of the second deployment step in the second DE and any necessary conversions are performed.

GUI 210 enables users of MDEMT 140 to define the desired functionality of MDEMT 140 and to implement the claimed functionality in an efficient manner. For example, GUI 210 displays action models and available deployment engines based upon the mappings generated mapping module 206. In addition, GUI 210 enables a user or administrator to select a corresponding deployment engine for the execution of each action model. Components 202, 204, 206, 208, 210, 212, 214, 216, 218 and 220 are described in more detail below in conjunction with FIGS. 4-9.

Figure 4:
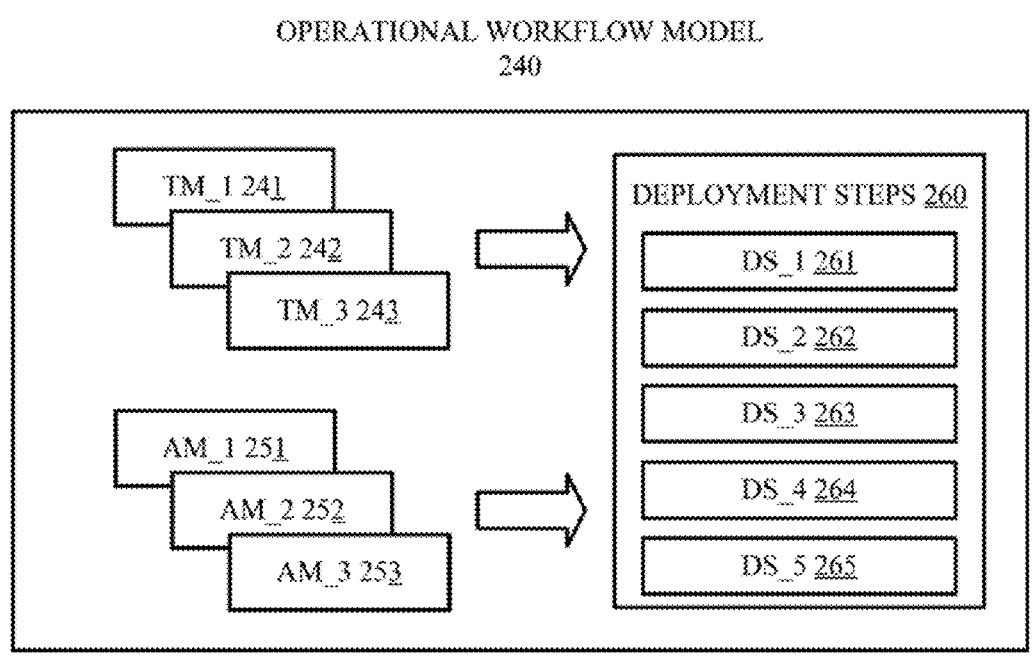
FIG. 4 is a block diagram of one simple example of the structure of a workflow model.

FIG. 4 is a block diagram of a one simple example of the structure of a workflow 240 that might be produced by MDEMT 140 (FIGS. 1-3). Simply stated, deployment steps 260, including a DS_1, 261, a DS_2 262, a DS_3 263, a DS-4 264 and a DS_5 265, are generated by action models, or a AM_1 251, a AM_2 252 and an AM_3 253, by matching components in topology models, or a TM_1 241, a TM_2 242 and a TM_3 243. It should be noted that, as explained in more detail below in conjunction with FIGS. 5 and 6, some of deployment steps 261-265 may be generated by MDEMT 140 to make a transition from one deployment engine 141-143 (FIGS. 1 and 2), including any data conversion that enable the output of one DE 141-143 to be compatible with the next, otherwise adjacent DE 141-143, For example, DS_2 262 may be generated to enable the output of DS_1 261 to be compatible with the input of DE_3 263 and to initiate the functionality of the DE 141-143 corresponding to DE_3 263.

Figure 5:
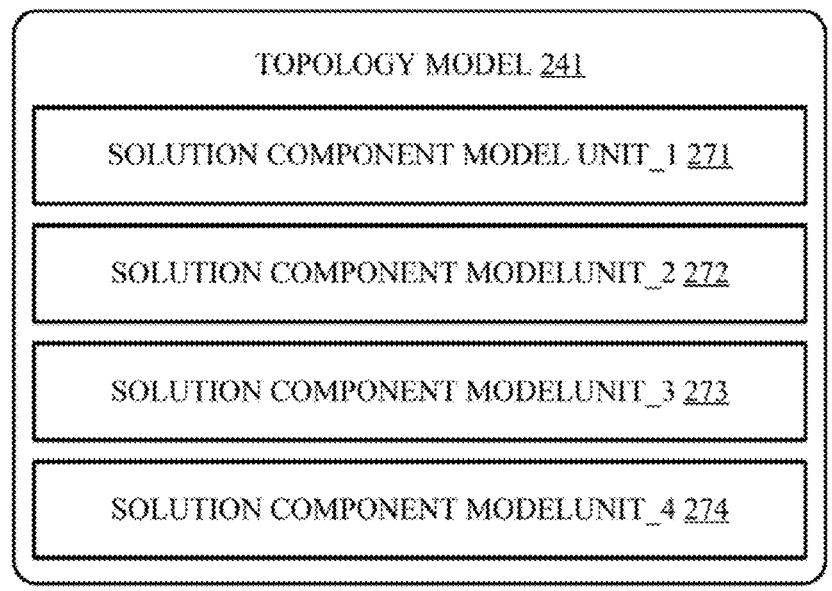
FIG. 5 is a block diagram showing aspects of a Topology model, specifically different component parts and their relationships among each other.

FIG. 5 is a block diagram showing aspects of a topology model, in this example TM 241 (FIG. 4), illustrating component parts and their relationships among each other. Topology model 241 contains solution component model units (SCMUs), i.e. solution component model units 1-4 271-274. Each solution component model unit 271-274 represents on aspect of a computing solution. For example, SCMU_1 271 might be a WebSphere unit, SCMU_2 272 might be a DB2 unit; SCMU_3 273 might be a Linux operating system unit, and SCMU_4 274 might be a VMWare virtual image unit. In that case, SCMU_1 271 and SCMU_2 272 might be hosted by SCMU_3 273 and SCMU_3 272 might be hosted by SCMU_4 274. Among other functions, SCMUs provide the structure of input and output parameters for corresponding operational model units (see 282, FIG. 6). It should be understood that a typical topology model might contain any number of solution component model units and topology model 241 is merely one simple example of a topology model, provided to introduce elements employed in the remainder of the Description.

Figure 6:
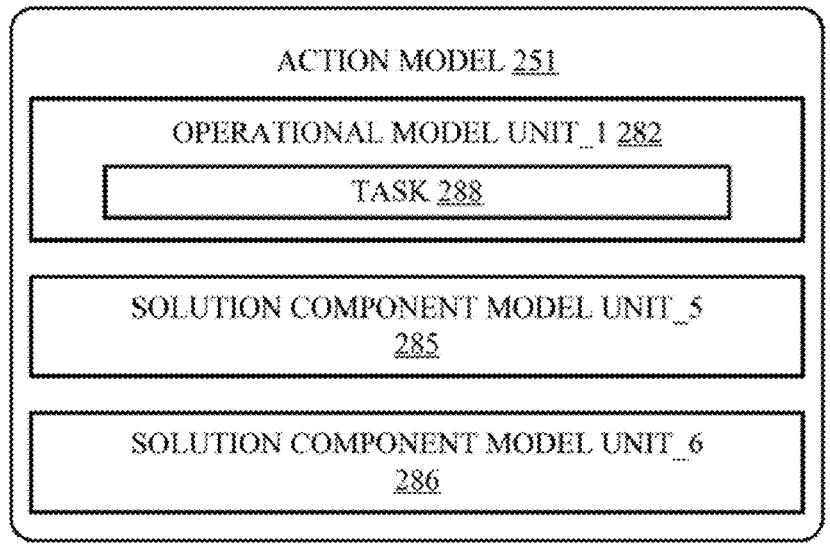
FIG. 6 is a block diagram showing aspects of an Action model, specifically different component parts and their relationships among each other.

FIG. 6 is a block diagram showing aspects of an action model, in this example AM 251 (FIG. 4), illustrating different component parts and their relationships among each other. Action model 251 contains an operational model unit 282 and one or more solution component model units (SCMU), which in this example are a SCMU_5 285 and a SCMU_6 286. SCMUs 285 and 286 are employed by operational model unit 282 to derive input and output parameters in conjunction with the claimed subject matter. Operational model unit 282 also includes a task 288. Each task such as task 288 maps to a deployment step, such as DSs 261-265 (FIG. 4). It should be understood that a typical action model might contain more than two operational units and action model 251 is merely one simple example of an action model, provided to introduce elements employed in the remainder of the Description.

Figure 7:
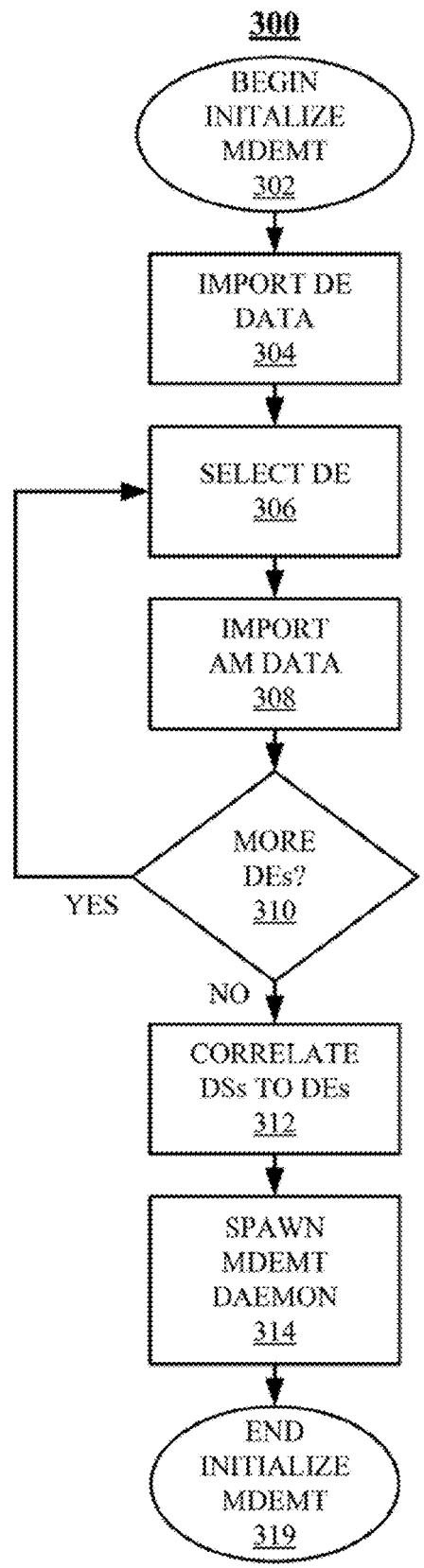
FIG. 7 is a flowchart of showing one example of an "Initialize MDEMT" process that my implement aspects of the claimed subject matter.

FIG. 7 is a flowchart of showing one example of an "Initialize MDEMT" 300 process that my implement aspects of the claimed subject matter. In the following example, logic associated with process 300 is stored on CRSM 162 (FIG. 2) and executed in conjunction with MDEMT 140 (FIGS. 1-3) on one or more processors (not shown) of CPU 154 (FIG. 2) of computing system 152 (FIG. 1).

Process 300 starts in a "Begin Initialize MDEMT" block 302 and proceeds immediately to an "Import Deployment Engine (DE) Data" block 304. During processing associated with block 304, MDEMT 140 retrieves and stores in DE data 216 (FIG. 3) information identifying available deployment engines, which in this example are DEs 141-143 (FIGS. 1 and 2). Such information may be entered manually by an administrator or retrieved form a previously prepared configuration file (not shown). During processing associated with a "Select DE" block 306, a first of the available DEs 141-143 is selected for processing.

During processing associated with an "Import Action Model (AM) Data" block 308, any action models associated with the DE selected during processing associated with block 306 are imported into AM data 214 (FIG. 3). As with the DE data, such information may be retrieved from a previously prepared configuration file. In addition, only action models appropriate to the current situation may be imported. During processing associated with a "More DEs?" block 310, a determination is made as to whether or not there are any DEs identified during processing associated with block 304 that have not yet been processed. If so, control returns to block 306, the next unprocessed DE is selected and processing continues as described above.

If, during processing associated with block 310, a determination is made that all identified DEs 141-143 have been processed, control proceeds to a "Correlate DSs to DEs" block 312. During processing associated with block 312, deployment steps corresponding to the action models imported during processing associated with block 308 are correlated to each DE 141-143 to which it may apply. In this manner, an administrator may, using a window (see FIG. 8) of GUI 210 (FIG. 3) may select a particular DE 141-143 to implement each deployment step in a selected workflow model 240.

Finally, During processing associated with block a "Spawn MDEMT Daemon" block 314, logic associated with operational processes of MDEMT 140 (see 300, FIG. 6) is initiated and control proceeds to an "End Initialize MDEMT" block 319 during which process 300 is complete.

Figure 8:
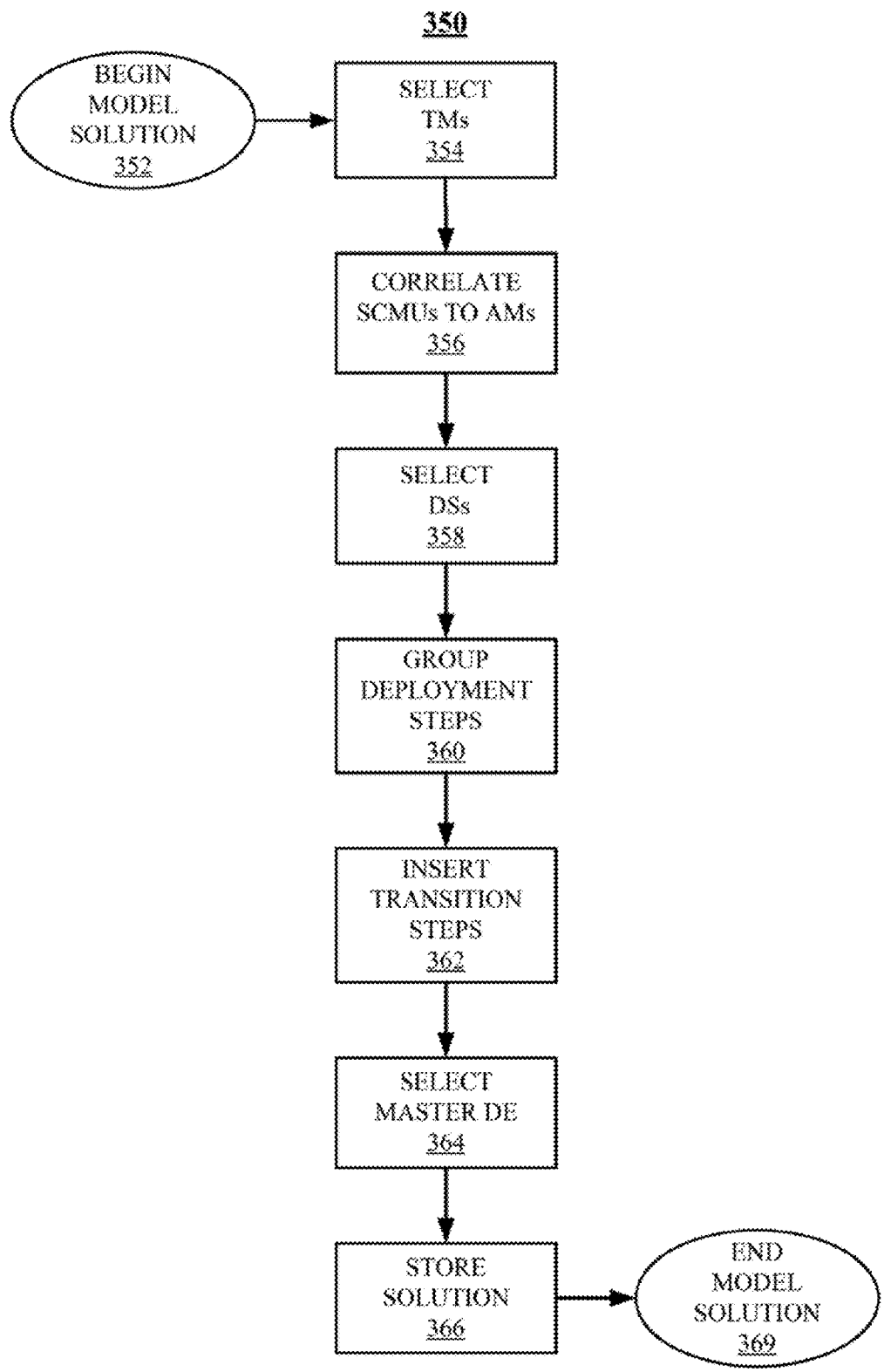
FIG. 8 is a flowchart of showing one example of a "Model Solution" process that my implement aspects of the claimed subject matter.

FIG. 8 is a flowchart of showing one example of a "Model Solution" process 350 that my implement aspects of the claimed subject matter. Like process 300 (FIG. 6), in the following example, logic associated with process 350 is stored on CRSM 162 (FIG. 2) and executed in conjunction with MDEMT 140 (FIGS. 1-3) on one or more processors (not shown) of CPU 154 (FIG. 2) of computing system 152 (FIG. 1).

Process 350 starts in a "Begin Model Solution" block 352 and proceeds immediately to a "Search for Topology Models (TMs)" block 354. During processing associated with block 354, topology models such as topology models 241-243 (FIG. 4) that are appropriate for desired workflow model 240 corresponding to the situation being addresses are selected. During processing associated with a "Correlate SCMUs to Action Models (AMs)" block 356, action models such as action models 251-253 (FIG. 4) that include SCMUs corresponding to the SCMUs in topology models 241-243 are selected. In other words, SCMUs in topology models 241-243 are matched with topology models 241 selected during processing associated with block 354 based upon corresponding SCMUs 271-274 and 282. It should be understood that each SCMU 271-274 may have multiple corresponding operational units from within action models 251-253.

During processing associated with a "Select Deployment Steps" block 358, corresponding pairs of operational elements from topology models 241-243 and action models 251-253 are selected as deployment steps to generate and operational workflow model such as operational workflow model 240 (see FIG. 4). It should be noted that there may by several possible operational units with each operational unit corresponding to a particular deployment engine. During processing associated with a "Group Deployment Steps" block 360, the deployment steps are grouped into continuous blocks, each block corresponding to one deployment engine. In one example, DSs 261-262, which implemented by DE_1 141 (FIGS. 1 and 2), would make up one group, DS_3 263, which is implemented by DE_2 142 (FIGS. 1 and 2), would make up a second group and DSs 264-264, which are implemented by DE_1 141, are make up a third group.

During processing associated with an "Insert Transition Steps" block 362, an action is inserted to invoke the deployment engine 141-143 corresponding to the next grouping. For example, after deployment steps 261-262 an implicit "transition" deployment step is inserted between DS_2 262 and DS_3 263. This transition deployment step (not shown) invokes DE_2 142, which is responsible for implementing the next grouping containing DS_3 263. Prior to invoking an deployment engine, each transition step is also responsible for modeling the output parameters corresponding to the last deployment step in preceding grouping into the input parameters corresponding to the first deployment step in the subsequent grouping. In other words, output parameters generated by the preceding deployment engine are converted to the input parameters required by the subsequent deployment engine. During processing associated with a Select Master DE" block 364, one of the available deployment engines 141-143 is selected as a "Master" deployment engine, which serves as a overall orchestrator of the workflow 240. The master deployment engine is responsible for invoking all the transition deployment steps and any control points, such as but not limited to, forks and joins identified by a solution designer.

Once all the deployment steps are selected and the transition deployment steps are generated and inserted into workflow 240, during a "Store Solution" block 366, workflow 240 is stored in memory for execution at a later time. Finally, control proceeds to an "End Model Solution" block 369 during which process 350 is complete.

Figure 9:
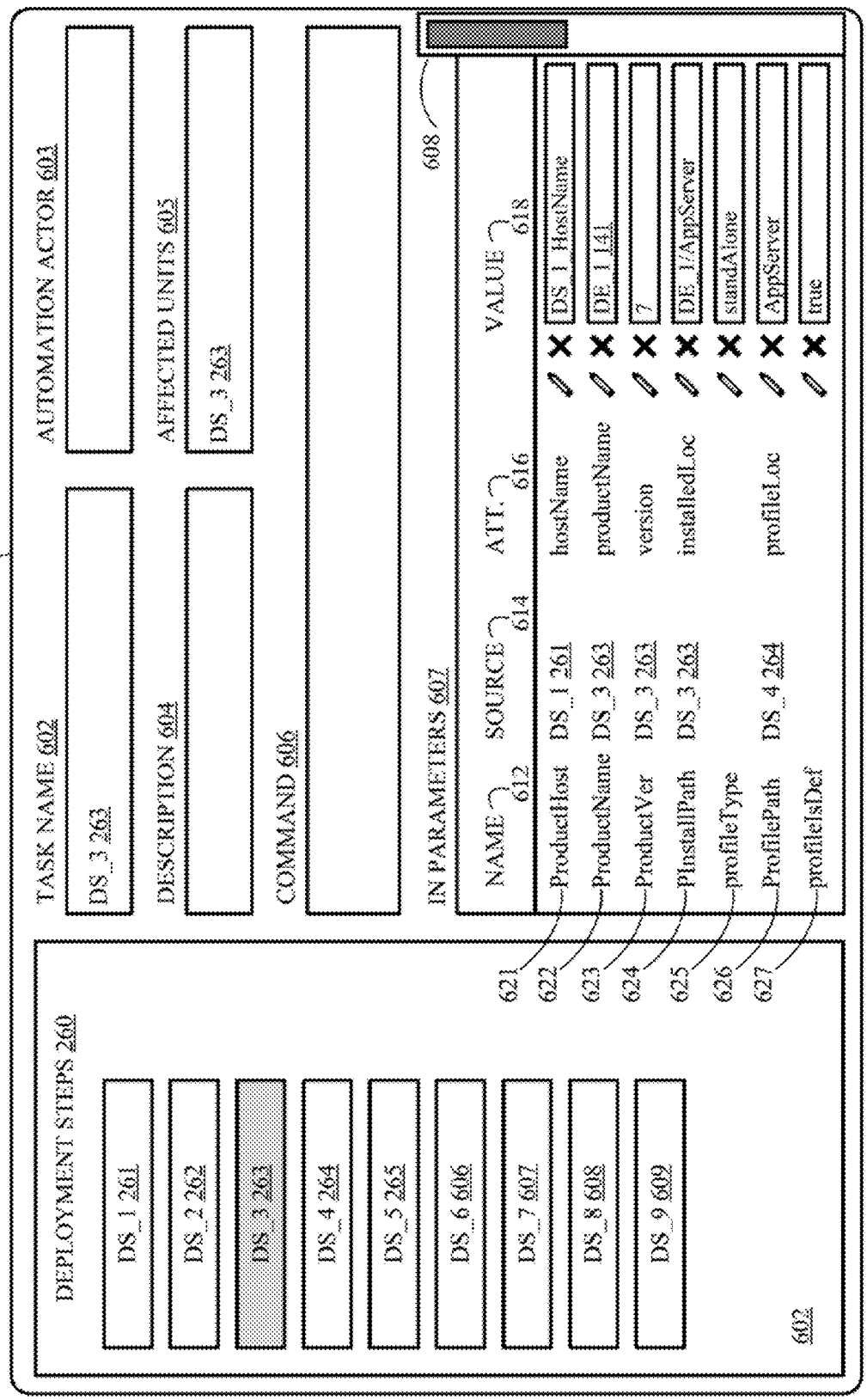
FIG. 9 is a block diagram of a display showing one example of a window generated by a GUI of MDEMT, specifically a window that enables an administration to define input, output and various other parameters associated with an operational unit.

FIG. 9 is a block diagram of display 156 (FIG. 2) showing one example of a window generated by GUI 210 (FIG. 3) of MDEMT 140 (FIGS. 1-3), specifically a window that enables an administration to define input, output and various other parameters associated with an operational unit, which in this example is operational unit 274 (FIG. 5). In other words, FIG. 9 shows one aspect of GUI 210 that enables the mapping of deployment steps to a particular deployment engine, including the mapping of output parameters from one deployment step to the input parameters of a deployment step that immediately follows.

In a Deployment Steps section 601, various deployment steps associated with a particular workflow model (see 240, FIG. 4) are listed. In this example, DS_1 261, DS_2 262, DS_3 263, DS_4 264 and DS_5 265, first introduces above in conjunction with FIG. 4, are shown. In addition, some additional deployment steps, i.e., a DS_6 606, a DS_7 607, a DS_8 608 and a DS_9 609 are shown. In this example, the entry for DS_3 263 is shaded, indicating that information entered into entry boxes to the right of section 601 correspond to DS_3 263. Examples of information entry boxes include a Task Name box 602, which is currently displaying the corresponding deployment step, or "DS_3," an Automation Actor box 603, a Description box 604, an Affected units box 605, a Command box 606 and an In Parameters box 607.

In Parameters box 607 includes several columns, each column representing information that defines the corresponding parameter, some of which that needs to be entered by an administrator. In this example, the columns include a "Name" column 612, a "Source" column 614, a Attribute (Att.) column 616 and a "Value" column 618. Examples of some in parameters 607 include a "ProductHost" parameter 611, a "ProductName" parameter 612, a "ProductVersion," (ProductVer) parameter 613, a "ProductInstallPath" (PInstallPath) parameter 614, a "ProfileType" parameter 615, a "ProfilePath" parameter 616 and a "ProfileISDef" parameter 617. A slide bar 608 enables more parameters than can be displayed in In Parameters 607 to be defined.

In addition to In Parameters 607, slide bar 607 provides access to an Out Parameters (not shown) that enables an administrator to define output parameters for the corresponding deployment step. However, rather than a Source column 614, Out parameters would include a "Target" column (not shown).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. An apparatus, comprising:
   a processor;
   a computer-readable storage medium coupled to the processor; and logic, stored on the computer-readable storage medium and executed on the processor, for:
modeling a plurality of operational units, each operational unit implementing a portion of an operational workflow by one or more deployment engines of a plurality of deployment engines;
selecting, for each of the plurality of operational units, one of the deployment engines of the one or more deployment engines;
ordering the operational units with respect to the operational workflow;
grouping the ordered operational units according to the selected deployment engines into a plurality of deployment engine groupings;
generating a first mapping showing a correlation between the plurality of operational units among the plurality of deployment engines;
generating a second mapping of a plurality of output parameters, corresponding to a first operational unit that concludes a first deployment engine grouping of the plurality of deployment engine groupings, to a plurality of input parameters corresponding to a second operational unit that initiates a second deployment engine grouping, wherein the second grouping immediately follows the first grouping with respect to the ordering;
inserting, based upon the first and second mapping, between the first operational unit and the second operational unit, a transitional operational unit for transitioning between a first deployment engine, corresponding to the first deployment engine grouping, and a second deployment engine, corresponding to the second deployment engine grouping, for generating a multi-deployment engine operational workflow, wherein the transitional operational unit comprises deployment tasks for performing the second mapping;
storing for execution the multi-deployment engine operational workflow; and
executing the multi-deployment engine operational workflow on a processor.

2. The apparatus of claim 1, the logic for inserting, between each adjacent deployment engine grouping comprising logic for mapping a plurality of output parameters corresponding to a first deployment action that concludes a first operational unit to a plurality of input parameters of a second deployment action that initiates a second operational unit.

3. The apparatus of claim 1, the logic further comprising logic for designating a particular deployment engine of the plurality of deployment engines as a master deployment engine, wherein the master deployment engine executes the transitional operational unit.

4. The apparatus of claim 1, the logic further comprising logic for inserting a transitional operational unit between each pair of adjacent deployment engine groupings.

5. The apparatus of claim 1, further comprising a graphical user interface (GUI) for the selecting, for each of the plurality of operational units, one of the deployment engines of the one or more deployment engines.

6. A computer programming product, comprising:
a non-transitory computer-readable storage medium; and
logic, stored on the computer-readable storage medium for execution on a processor, for:
modeling a plurality of operational units, each operational unit implementing a portion of an operational workflow by one or more deployment engines of a plurality of deployment engines;
selecting, for each of the plurality of operational units, one of the deployment engines of the one or more deployment engines;
ordering the operational units with respect to the operational workflow;
grouping the ordered operational units according to the selected deployment engines into a plurality of deployment engine groupings;
generating a first mapping showing a correlation between the plurality of operational units among the plurality of deployment engines;
generating a second mapping of a plurality of output parameters, corresponding to a first operational unit that concludes a first deployment engine grouping of the plurality of deployment engine groupings, to a plurality of input parameters corresponding to a second operational unit that initiates a second deployment engine grouping, wherein the second grouping immediately follows the first grouping with respect to the ordering;
inserting, based upon the first and second mapping, between the first operational unit and the second operational unit, a transitional operational unit for transitioning between a first deployment engine, corresponding to the first deployment engine grouping, and a second deployment engine, corresponding to the second deployment engine grouping, for generating a multi-deployment engine operational workflow, wherein the transitional operational unit comprises deployment tasks for performing the second mapping;
storing for execution the multi-deployment engine operational workflow; and
executing the multi-deployment engine operational workflow on a processor.

7. The computer programming product of claim 6, the logic for inserting, between each adjacent deployment engine grouping comprising logic for mapping a plurality of output parameters corresponding to a first deployment action that concludes a first operational unit to a plurality of input parameters of a second deployment action that initiates a second operational unit.

8. The computer programming product of claim 6, the logic further comprising logic for designating a particular deployment engine of the plurality of deployment engines as a master deployment engine, wherein the master deployment engine executes the transitional operational unit.

9. The computer programming product of claim 6, the logic further comprising logic for inserting a transitional operational unit between each pair of adjacent deployment engine groupings.

10. The computer programming product of claim 6, the logic further comprising logic for providing a graphical user interface (GUI) for the selecting, for each of the plurality of operational units, one of the deployment engines of the one or more deployment engines.

11. A multi-deployment engine deployment system, comprising:
a processor;
a computer-readable storage medium coupled to the processor; and
logic, stored on the computer-readable storage medium and executed on the processor, for:
importing deployment data associated with a plurality of deployment engines;

modeling, based on the deployment data, a plurality of operational units, each operational unit implementing a portion of an operational workflow, and each operational unit having one or more input parameters and one or more output parameters;

selecting, for each of the plurality of operational units, one of a plurality of deployment engines;

ordering the operational units with respect to the operational workflow;

grouping the ordered operational units according to the selected deployment engines into a plurality of deployment engine groupings;

generating a first mapping showing a correlation between the plurality of operational units among the plurality of deployment engines;

generating a second mapping of a plurality of output parameters, corresponding to a first operational unit that concludes a first deployment engine grouping of the plurality of deployment engine groupings, to a plurality of input parameters corresponding to a second operational unit that initiates a second deployment engine grouping, wherein the second grouping immediately follows the first grouping with respect to the ordering;

inserting, based upon the first and second mapping, between the first operational unit and the second operational unit, a transitional operational unit for transitioning between a first deployment engine, corresponding to the first deployment engine grouping, and a second deployment engine, corresponding to the second deployment engine grouping, for generating a multi-deployment engine operational workflow, wherein the transitional operational unit implements deployment tasks for performing the second mapping;

generating the multi-deployment engine operational workflow based on a sequence of the first deployment engine grouping, the transitional operational unit, and the second deployment engine grouping;

storing for execution the multi-deployment engine operational workflow; and executing the multi-deployment engine operational workflow on a processor.

12. The multi-deployment engine deployment system of claim 11, the logic for inserting, between each adjacent deployment engine grouping comprising logic for mapping a plurality of output parameters corresponding to a first deployment action that concludes a first operational unit to a plurality of input parameters of a second deployment action that initiates a second operational unit.

13. The multi-deployment engine deployment system of claim 11, the logic further comprising logic for designating a particular deployment engine of the plurality of deployment engines as a master deployment engine, wherein the master deployment engine executes the transitional operational unit.

14. The multi-deployment engine deployment system of claim 11, the logic further comprising logic for inserting a transitional operational unit between each pair of adjacent deployment engine groupings.

15. The multi-deployment engine deployment system of claim 11, further comprising a graphical user interface (GUI) for the selecting, for each of the plurality of operational units, one of the deployment engines of the one or more deployment engines.

* * * * *